US005780205A

United States Patent [19]
Beckers et al.

[11] Patent Number: 5,780,205
[45] Date of Patent: Jul. 14, 1998

[54] METHOD FOR MANUFACTURING A MOLD FOR A DISC-SHAPED REGISTRATION CARRIER

[75] Inventors: Lodewijk J. M. Beckers, Overpelt, Belgium; Christopher Jayne, Eindhoven, Netherlands; Joseph P. De Nijs, Geldrop, Netherlands; Marcellus A. C. M. Geerts, Eindhoven, Netherlands

[73] Assignee: OD & ME B.V., Eindhoven, Netherlands

[21] Appl. No.: 838,805

[22] Filed: Apr. 10, 1997

Related U.S. Application Data

[60] Continuation of Ser. No. 330,088, Oct. 26, 1994, abandoned, which is a division of Ser. No. 138,224, Oct. 20, 1993, Pat. No. 5,403,397.

[30] Foreign Application Priority Data

Oct. 21, 1992 [NL] Netherlands .............. 9201825

[51] Int. Cl.$^6$ .................. G03F 7/00; G11B 7/26
[52] U.S. Cl. .................. 430/320; 430/321; 430/945; 427/470; 427/532; 427/541; 427/555; 427/162; 427/348
[58] Field of Search .................. 430/320, 321, 430/945; 264/2.5; 427/470, 512, 532, 541, 555, 162, 348

[56] References Cited

U.S. PATENT DOCUMENTS 4,604,027  8/1986  Becker et al. .......... 414/222
4,650,735  3/1987  De Laat .......... 430/320
4,787,800  11/1988  Soue et al. .......... 414/749
4,850,791  7/1989  Kuriyama et al. .......... 414/750
4,911,597  3/1990  Mayday et al. .......... 414/217
5,188,501  2/1993  Tomita et al. .......... 414/416
5,232,505  8/1993  Novak et al. .......... 118/712

FOREIGN PATENT DOCUMENTS 61-178747  11/1986  Japan
62-65827   3/1987   Japan
4-221444   8/1992   Japan
4-051444   6/1993   Japan

*Primary Examiner*—John A. McPherson
*Attorney, Agent, or Firm*—Cushman Darby & Cushman Intellectual Property Group of Pillsbury Madison & Sutro LLP

[57] ABSTRACT

The invention relates to a device and a method for manufacturing a mould for a disc-shaped registration carrier, said device being provided with a station for applying a photosensitive layer, such as a photoresist layer, to a substrate, with a station for exposing said photosensitive layer in accordance with the registration data to be stored, with a station for developing the photosensitive layer and metallizing the side of the substrate carrying the developed photoresist layer, and with a station for applying a metal coating, wherein the various stations are accommodated in a housing and means for receiving the substrates are provided in the various stations, whilst a transport mechanism disposed within the housing is provided with at least one transport means for gripping a substrate, which transport means is movable in a horizontal plane in two directions including an angle with each other, and which is also capable of moving upward and downward within the housing.

5 Claims, 16 Drawing Sheets

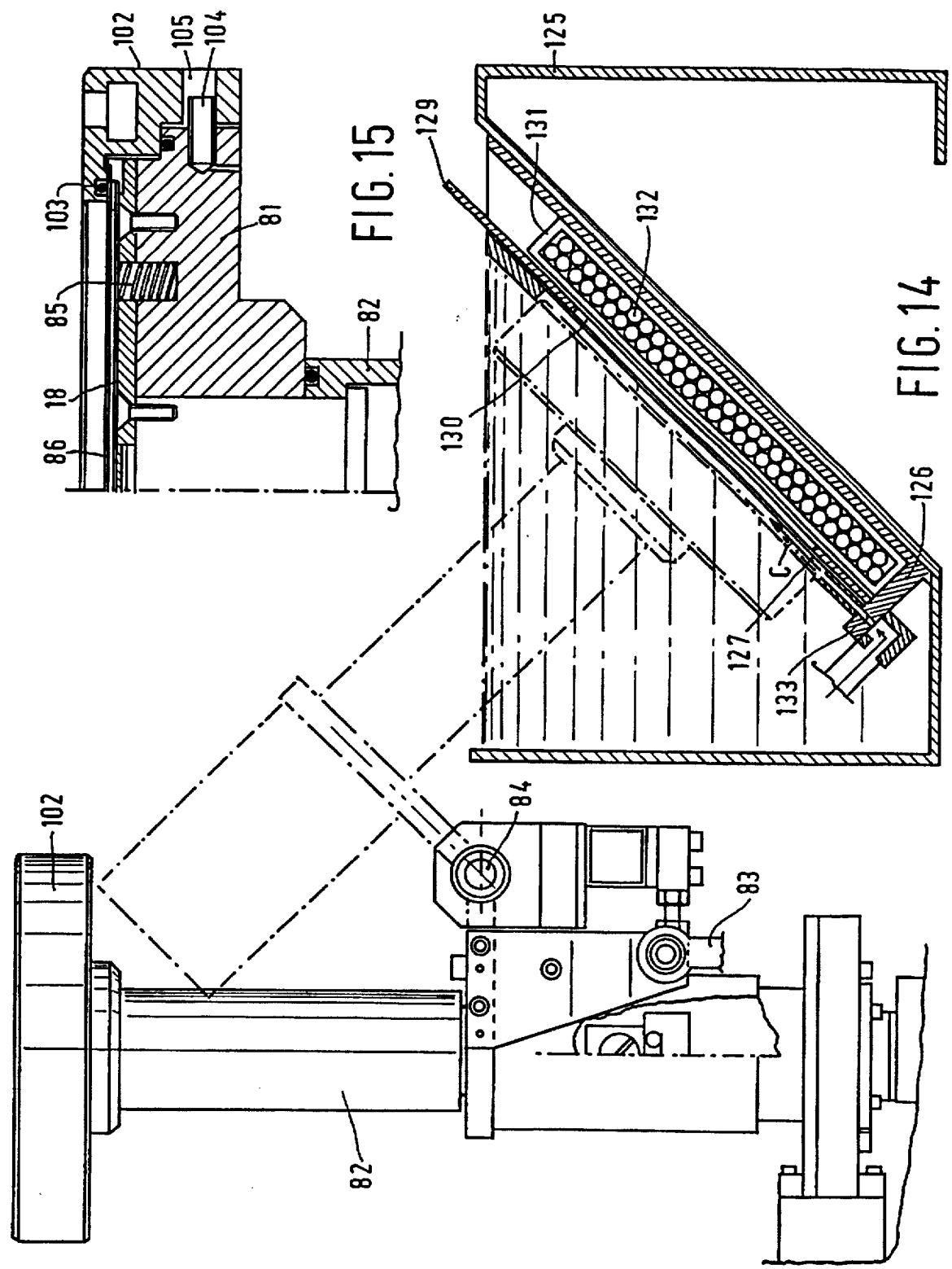

METHOD FOR MANUFACTURING A MOLD FOR A DISC-SHAPED REGISTRATION CARRIER

This is a continuation of application Ser. No. 08/330,088, filed on Oct. 26, 1994, now abandoned, which was abandoned upon the filing hereof, and Divisional application Ser. No. 08/138,224, filed Oct. 20, 1993, now U.S. Pat. No. 5,403,397, issued Apr. 4, 1995.

The invention relates to a device for manufacturing a mould for a disc-shaped registration carrier, said device being provided with a station for applying a photosensitive layer, such as a photoresist layer, to a substrate, with a station for exposing said photosensitive layer in accordance with the registration data to be stored, with a station for developing the photosensitive layer and metallizing the side of the substrate carrying the developed photoresist layer, with a station for applying a metal coating and with a station for applying a protective lacquer coating.

The term registration carriers is understood to mean sound and/or picture carriers and/or data carriers and the like, for example so-called compact discs, as well as carriers which can be processed at a later stage for storing sound, pictures or other data to be registered thereon.

A method for manufacturing such a mould is for example described in Dutch Patent Application No. 8802211. Said publication does not provide any indication with regard to the construction of a device to be used for carrying out such a method, however.

Dutch Patent Application No. 8702157 describes a device for carrying out a certain treatment of such registration carriers, whereby the device is provided with a rotary table for supporting a registration carrier, which rotary table and its driving mechanism are movable between several stations. Not only does this lead to a complicated construction of the device, but a further drawback is that the processing of a registration carrier in the first station cannot start before the processing in the last station has been completed and the rotary table has been returned to the first station. It will be apparent that an economical mass production cannot be realized with such a device.

Furthermore it has been proposed to design the various above-mentioned stations as separate units, and to transport registration carriers between the various stations in cassettes. An arrangement of separate stations of this kind requires a great deal of space, whilst also the transport between the various stations constitutes a disadvantageous factor, which slows down the production process.

The object of the invention is to obtain a device of the above kind, which can have an efficient and compact construction and wherein the successive operations can take place in succession and without the operator having to take action.

According to the invention this can be achieved in that the various stations are accommodated in a housing and means for receiving the substrates are provided in the various stations, whilst a transport mechanism disposed within the housing is provided with at least one transport means for gripping a substrate, which transport means is movable in a horizontal plane in two directions including an angle with each other, and which is also capable of moving upward and downward within the housing.

When using the construction according to the invention the substrates may be transported in the desired manner by means of the transport mechanism, between the substrate receiving means provided in the various stations, whilst desired operations may be carried out, independently of each other, on the substrate in each of said stations.

The invention will be explained in more detail hereafter with reference to an embodiment of the construction according to the invention diagrammatically illustrated in the accompanying Figures.

FIG. 14 shows a mechanism for carrying out the immersing step in a bath (likewise shown) containing electrolytic fluid.

FIG. 15 is a larger-scale view of a detail of the construction shown in FIG. 14.

Figure 1:
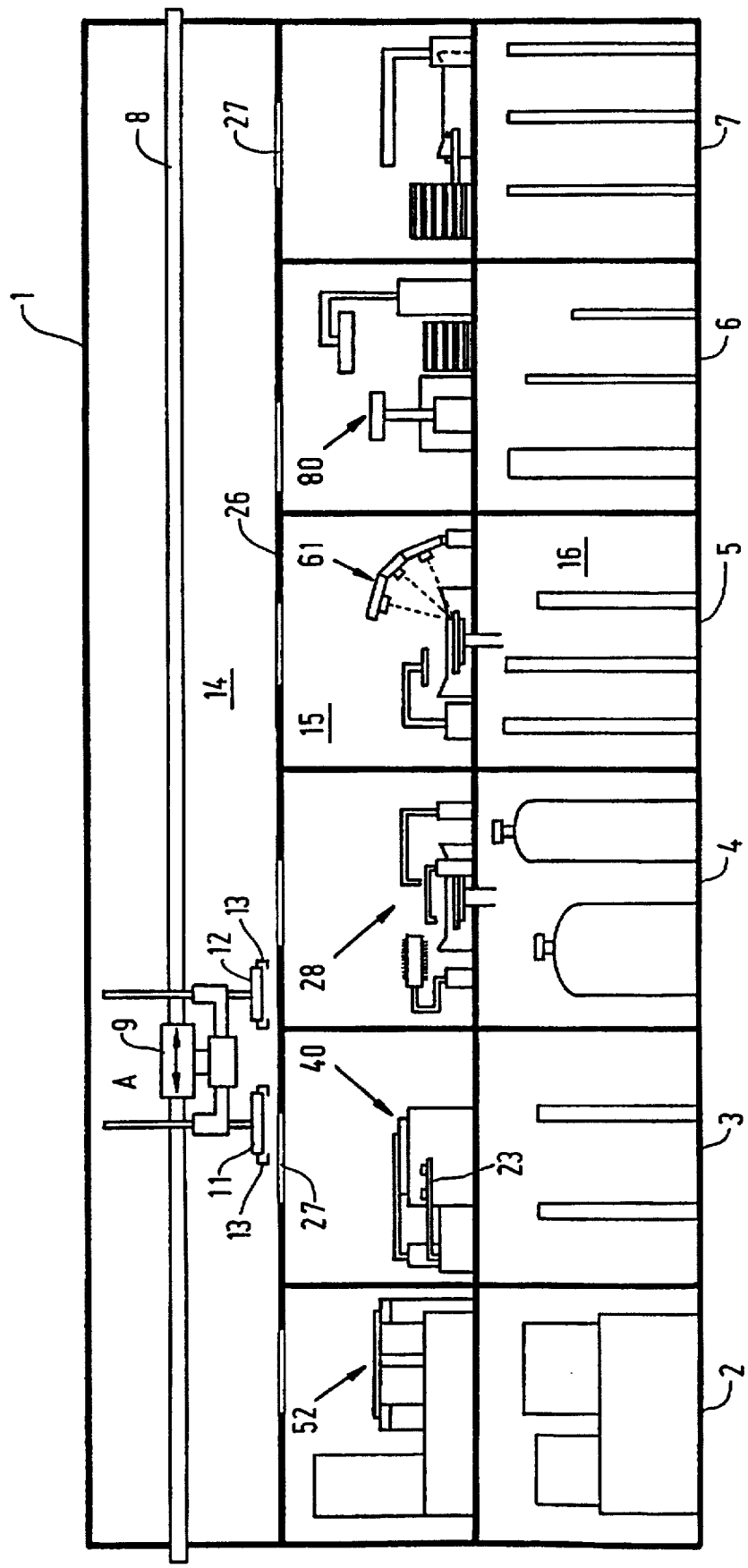
FIG. 1 is a diagrammatic front view of the device according to the invention.
Figure 2:
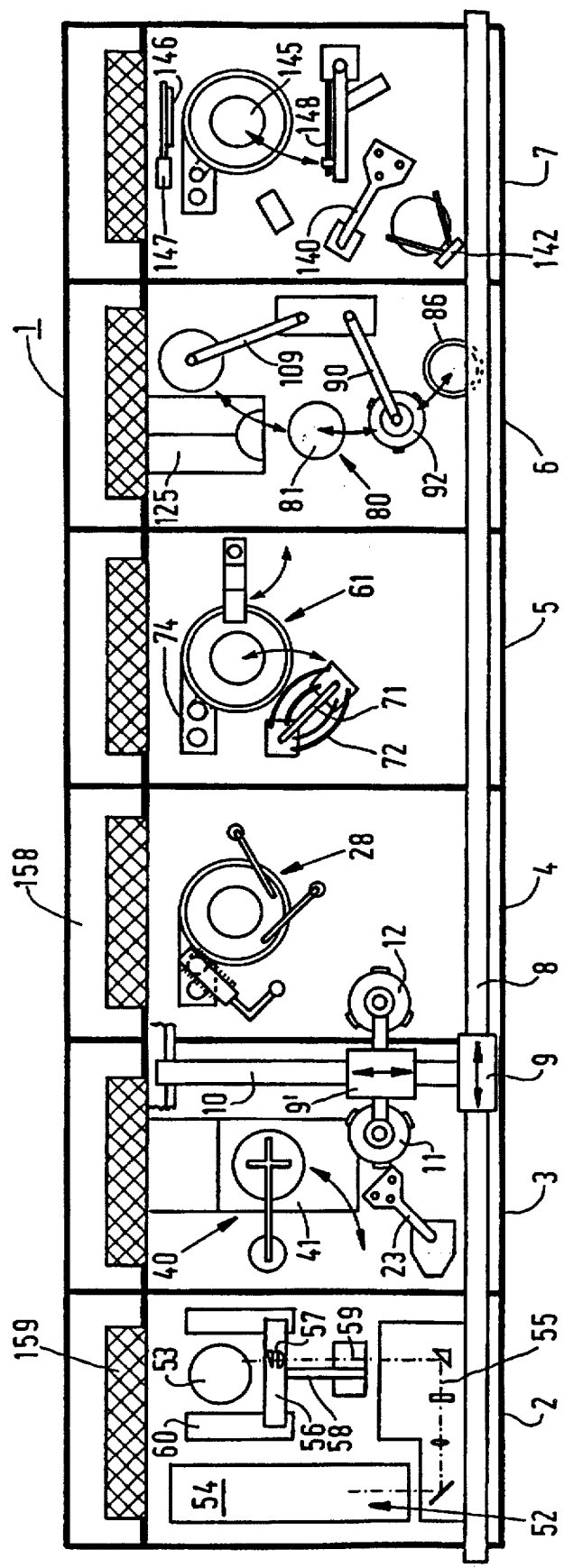
FIG. 2 is a diagrammatic plan view of the various stations of the device according to the invention.
Figure 3:
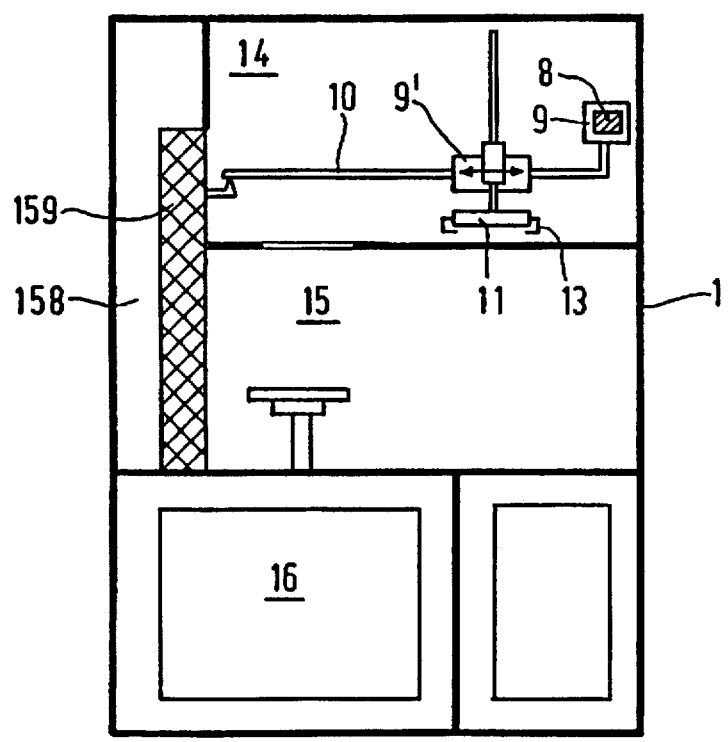
FIG. 3 is a cross-sectional view of the device shown in FIGS. 1 and 2.

The device shown in FIGS. 1-3 comprises a housing 1, which is closed during normal operation, in which several units 2-7 are accommodated. Preferably the design of said units 2-7 is such that it is possible to remove such a unit as a whole, so as to be replaced as desired by a unit carrying out (a) corresponding operation(s) or (an)other operation(s).

Near the upper side of the device a girder 8 is provided, which extends in the longitudinal direction of the device and which forms part of a transport mechanism. A slide 9 is reciprocatingly movable along said girder by means of a driving mechanism (not shown), as indicated by means of the arrow A. The slide 9 supports a girder 10 extending perpendicularly to the girder 8, along which a further slide 9' is reciprocatingly movable in the direction according to the arrow B. The slide 10 functions to support two transport means 11 and 12, which are provided with radially movable hook-shaped fingers 13. The transport means 11 and 12 are reciprocatingly movable in vertical direction by driving means (not shown).

When the fingers 13 have been moved radially outwards a transport means can be placed on a substrate, and when the fingers 13 are moved inwards again the hook-shaped ends of the fingers will engage under the substrate, so that the substrate can thus be lifted by a respective transport means and be moved through the housing by means of the above-described transport mechanism.

As will furthermore be apparent from FIGS. 1–3 the housing may be subdivided into three compartments 14–16, one being located above the other. The uppermost compartment 14 actually accommodates the transport mechanism. The compartment 15 located thereunder, which may be subdivided near the units 2–7 in the manner shown in FIGS. 1 and 2, accommodates the various means yet to be described for processing the registration carrier. At least some of these units will be provided with a rotary table as diagrammatically indicated in FIG. 3.

The lowermost compartment 16, likewise subdivided in correlation with the units 2–7, will accommodate auxiliary means, such as electronic equipment, liquid-containing vessels and the like. Preferably said auxiliary means are disposed on slides, so that they can be moved into and out of the housing transversely to the longitudinal direction of the housing in order to carry out maintenance work and the like.

The unit 3 is provided with an opening, through which a holder supporting a number of substrates arranged one on top of the other, generally glass discs, may be disposed in the device. A mechanism, which is shown in more detail in FIGS. 4 and 5, is disposed near said introduction opening, said mechanism functioning to remove a substrate from the stack and deliver said substrate to the transport mechanism.

Figure 4:
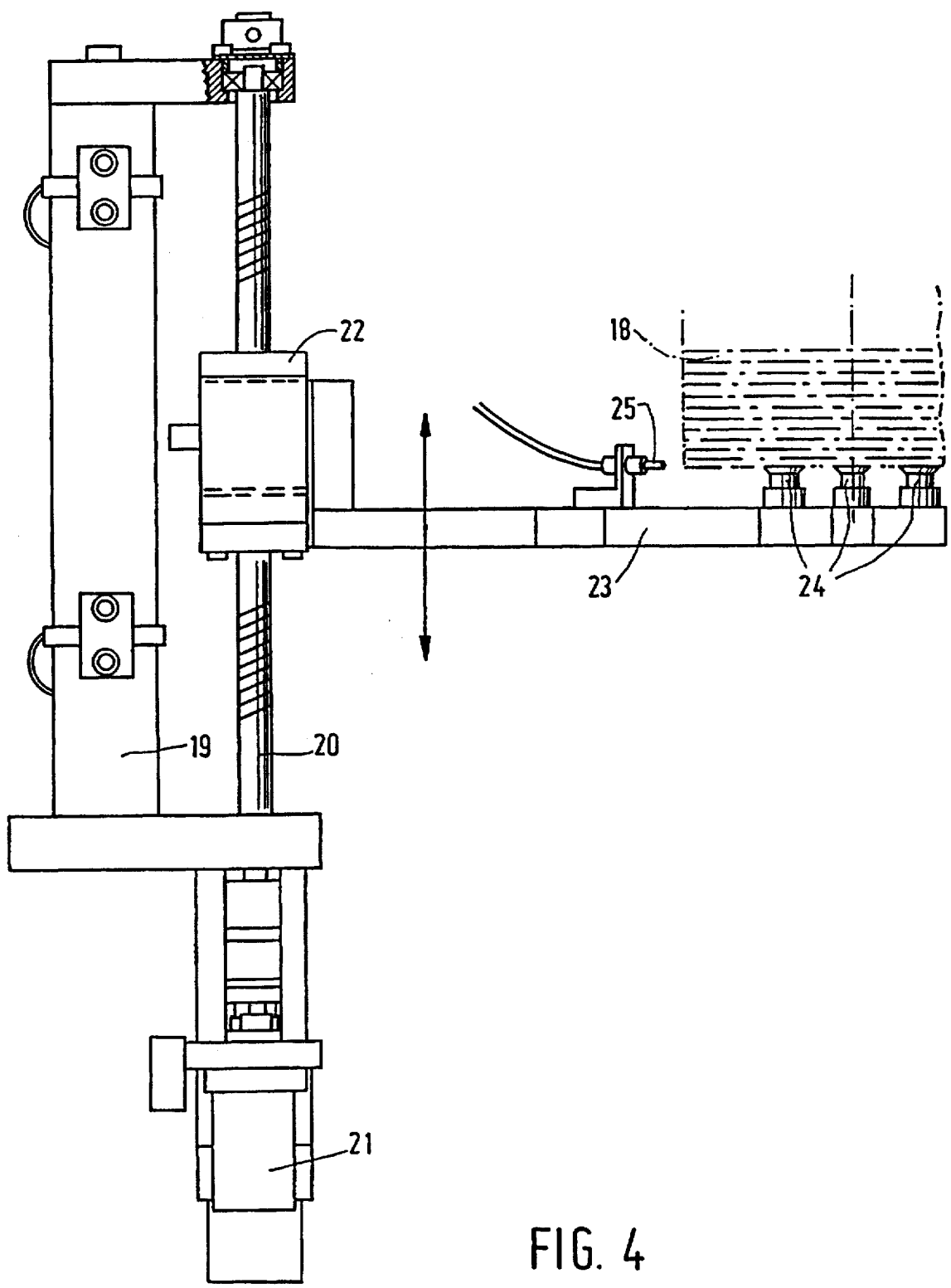
FIG. 4 is an elevational view of a device for removing a substrate from a stack of substrates and for transferring said substrate to the transport mechanism.

As is shown in FIG. 4 a number of substrates 18, for example glass discs, are stacked one on top of the other within the housing.

Figure 5:
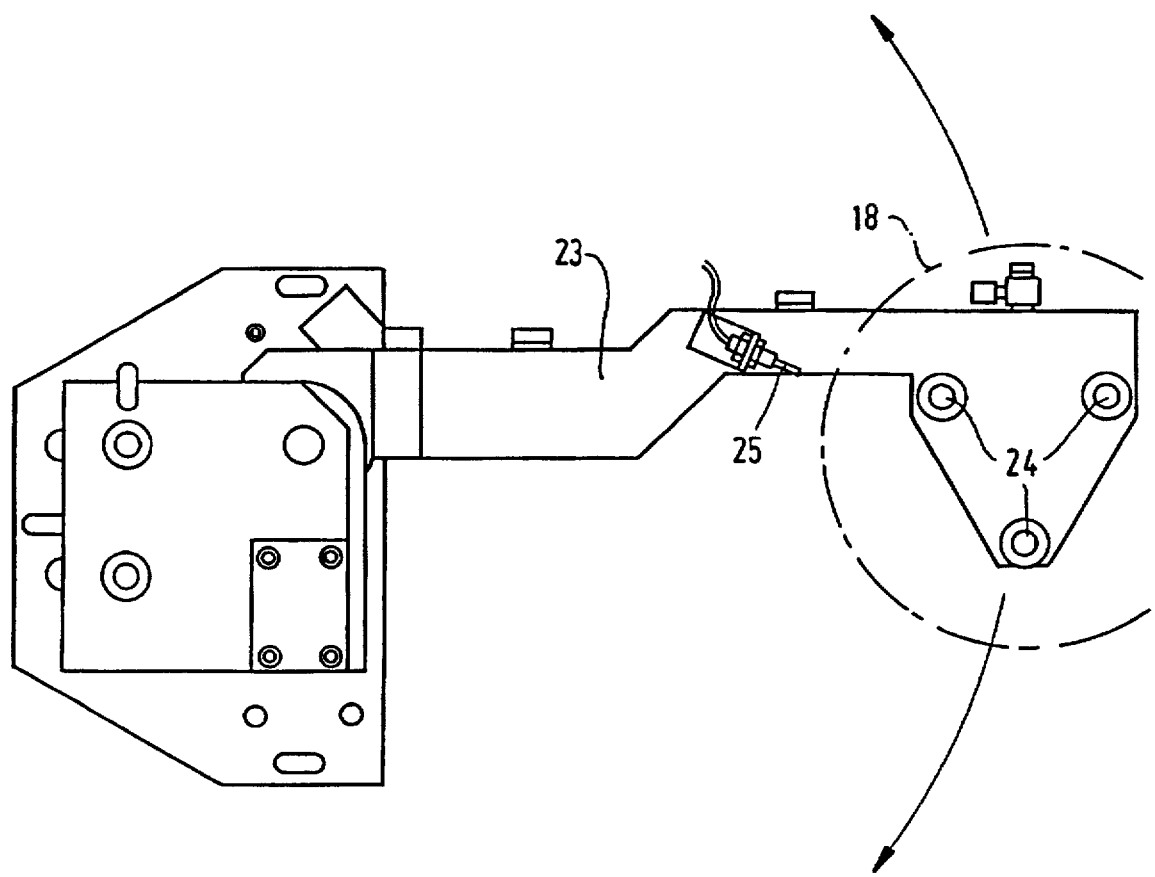
FIG. 5 is a plan view of FIG. 4.

The mechanism shown in FIGS. 4 and 5 comprises a support 19 secured to the frame of the device, in which a vertical lead screw 20 is rotatably journalled. The lead screw 20 can be rotated by means of a driving motor 21 connected to said lead screw.

The lead screw 20 is passed through a nut means 22, which is locked against rotation about the central axis of the lead screw 20 in a manner not shown. Connected to said nut means 22 is one end of an arm 23, which is rotatable about the central axis of the lead screw 20 with respect to the nut means 22, by driving means not shown, and which is capable of vertical reciprocating movement along with the lead screw.

Three suction pads 24 facing upwards are secured to the free end of the arm 23.

When a stack of substrates 18 has been placed in the device, the arm 23 may be moved to a position under the stack by means of a suitable control mechanism, then be pivoted under the stack and be moved upwards until the suction pads 24 abut against the bottom side of the lowermost substrate 18. This position is detected by means of a sensor 25 mounted on the arm. In the suction pads 24 a sub-atmospheric pressure can be generated by means not shown, after which the lowermost substrate 18 can be pivoted away from its position under the stack of substrates remaining behind to a position beside the holder with substrates. In this position the substrate 18 can be taken over from the arm 23 by one of the transport means 11 or 12.

As will become apparent hereafter the registration carriers will be wet during certain stages of the process. On the basis of this two transport means 11 and 12 are provided, as already mentioned above, so that the one transport means may be used for transporting dry substrates and the other transport means may be used for transporting wet substrates, as a result of which undesirable contamination of the substrate and the device can be avoided.

After a substrate 18, usually formed by a glass disc, has been picked up by a transport means 11, 12, said substrate may be moved upwards into the space 14 through a hole 27 provided in the wall 26 closing the compartment 15 at its upper side and be transported to the unit 4, in order to be moved downwards there through a hole 27 provided in the wall 26 to a station 28 for cleaning and applying a first coating and a so-called lacquer coating or photoresist layer.

Figure 6:
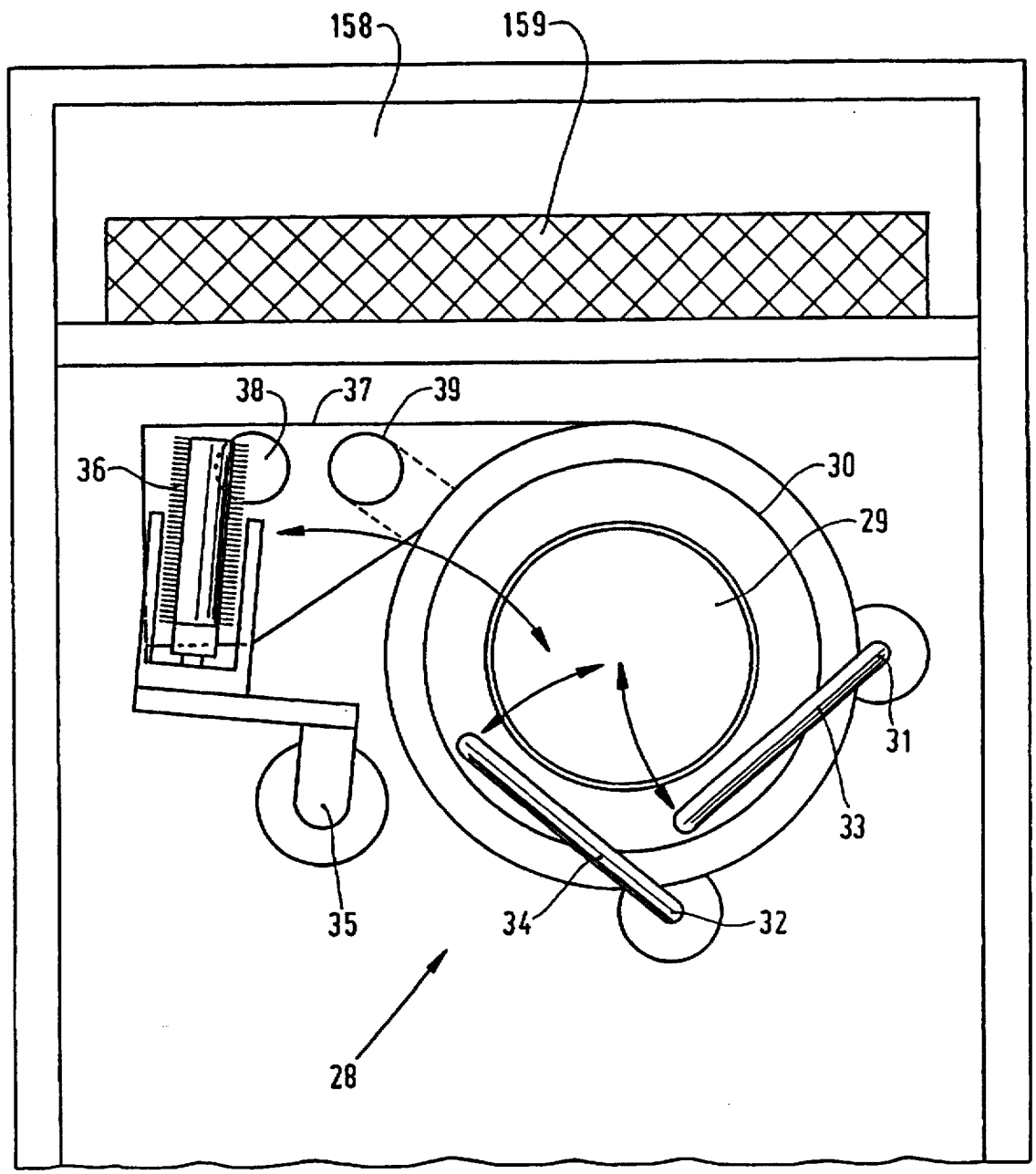
FIG. 6 is a plan view of the mechanism for cleaning and applying a first coating and a photoresist layer.

As is diagrammatically shown in FIG. 6 this station 28 comprises a rotary table 29, which is disposed within a cup-shaped means, whose construction at least substantially corresponds with the cup-shaped yet to be described in more detail with reference to FIG. 9.

Furthermore two supply pipes 33 and 34, which are pivotable about vertical axes of rotation 31 and 32 respectively, are provided in this station, as well as a cleaning means, which is pivotable about a vertical axis of rotation and which is capable of vertical reciprocating movement, such as for example a brush means 36, said brush means being rotatable about a horizontal axis of rotation.

Whilst the substrate placed on the rotary table 29 is rotated by means of said rotary table a rinsing liquid, deionized water in this case, will be spread over the upper surface of the substrate by means of the supply pipe 33 in order to rinse the substrate. While rinsing liquid is being supplied the upper surface of the substrate is also brushed clean by means of the brush 36, which has been pivoted to a position above the substrate. After cleaning the brush may be pivoted back to the position shown in FIG. 6, in which the brush is located above a pan 37 (diagrammatically shown), to which a drain pipe 38 is connected for draining moisture dripping from the brush. After rinsing a first coating may be applied via pipe 33. After a first coating has been applied the material for forming the eventual lacquer coating or so-called photoresist layer is applied by means of the supply pipe 34 and spread over the substrate surface.

Furthermore a suction pipe 39 for exhausting vapours is connected to the cup-shaped pan 30.

After the lacquer coating or photoresist layer has thus been applied to the substrate, said substrate will be moved by means of the transport mechanism to the station 40 for drying the lacquer coating.

An air line with a horizontal pipe part 41 shown in station 40 in the Figures is provided for the drying of the lacquer. A rotary table 42 is at least partially disposed within the interior of the pipe part 41, through a hole provided in the bottom wall of the pipe part 41. Said rotary table is provided with three suction pads 43, in which a sub-atmospheric pressure can be generated for fixing a substrate 18 on the rotary table in question. The rotary table can be rotated by means of a driving motor 44 coupled to the rotary table.

The substrate 18 can be placed on the rotary table by means of the transport mechanism, through an opening provided in the upper wall of the pipe part 41, which opening can be closed by means of a cover 45. The cover 45 is secured to one end of a supporting arm 45'. The supporting arm 45' is secured to a vertical shaft 46, which can be rotated about its central axis by means of a rotation motor 47.

The shaft 46 is furthermore supported by a supporting mechanism 48, which can be moved upwards and downwards by means of a setting cylinder 49. Thus, in order to open the aperture provided in the upper wall of the pipe part 41, the cover 44 may be moved upwards and then be pivoted horizontally from the position illustrated in full lines in FIG. 7 to the position illustrated in dotted lines in FIG. 7.

After the substrate has been placed on the rotary table the air passage may be closed by moving the cover in opposite direction. Then an air flow may be generated in the air passage by means of a fan (not shown). Heating coils 50 extending perpendicularly to the longitudinal direction of the air passage are provided for the heating of the air in the air passage, said heating coils in FIG. 7 being shown in a position turned through 90° with respect to their actual position.

Figure 7:
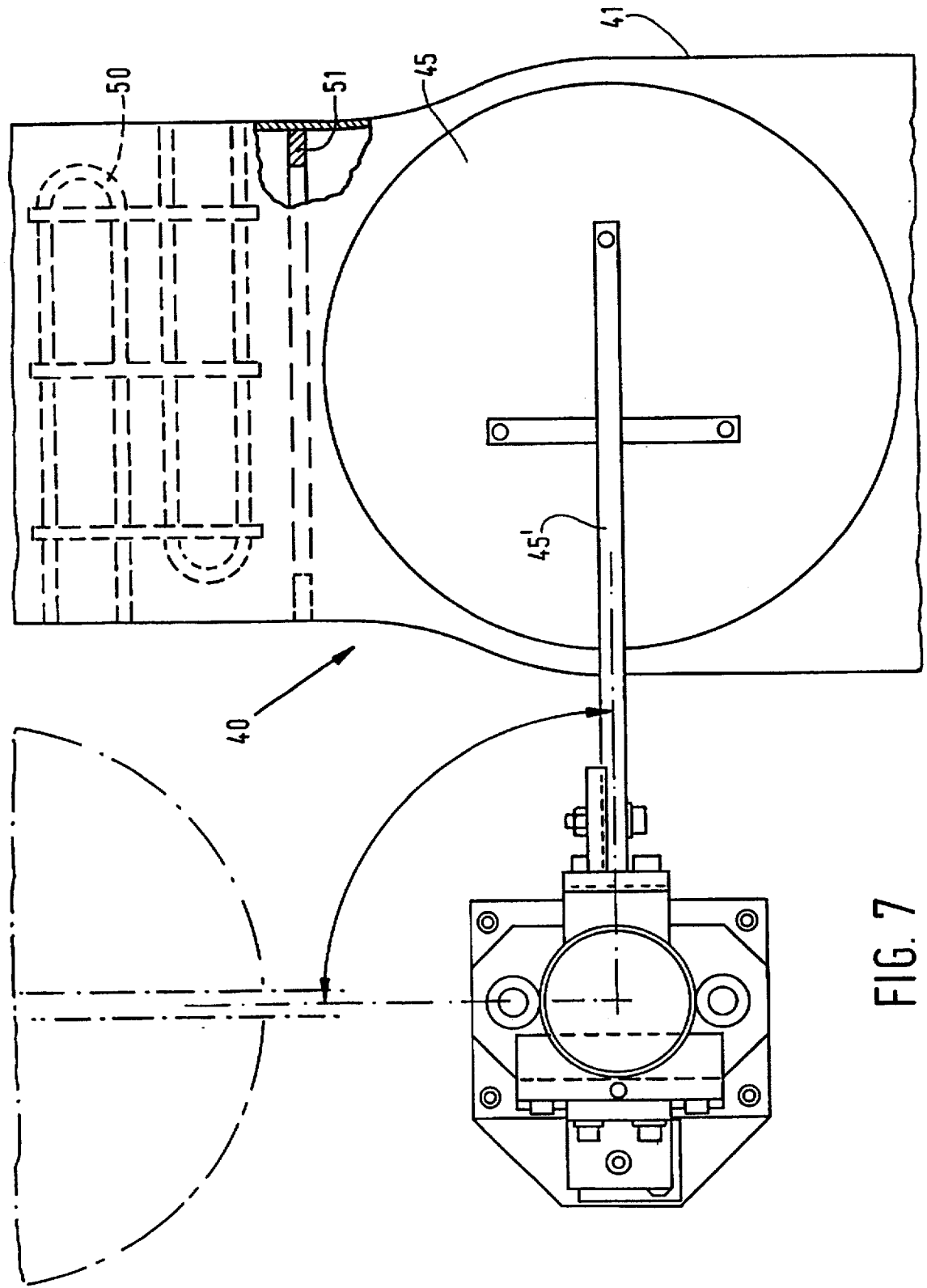
FIG. 7 is a plan view of parts of a drying station.
Figure 8:
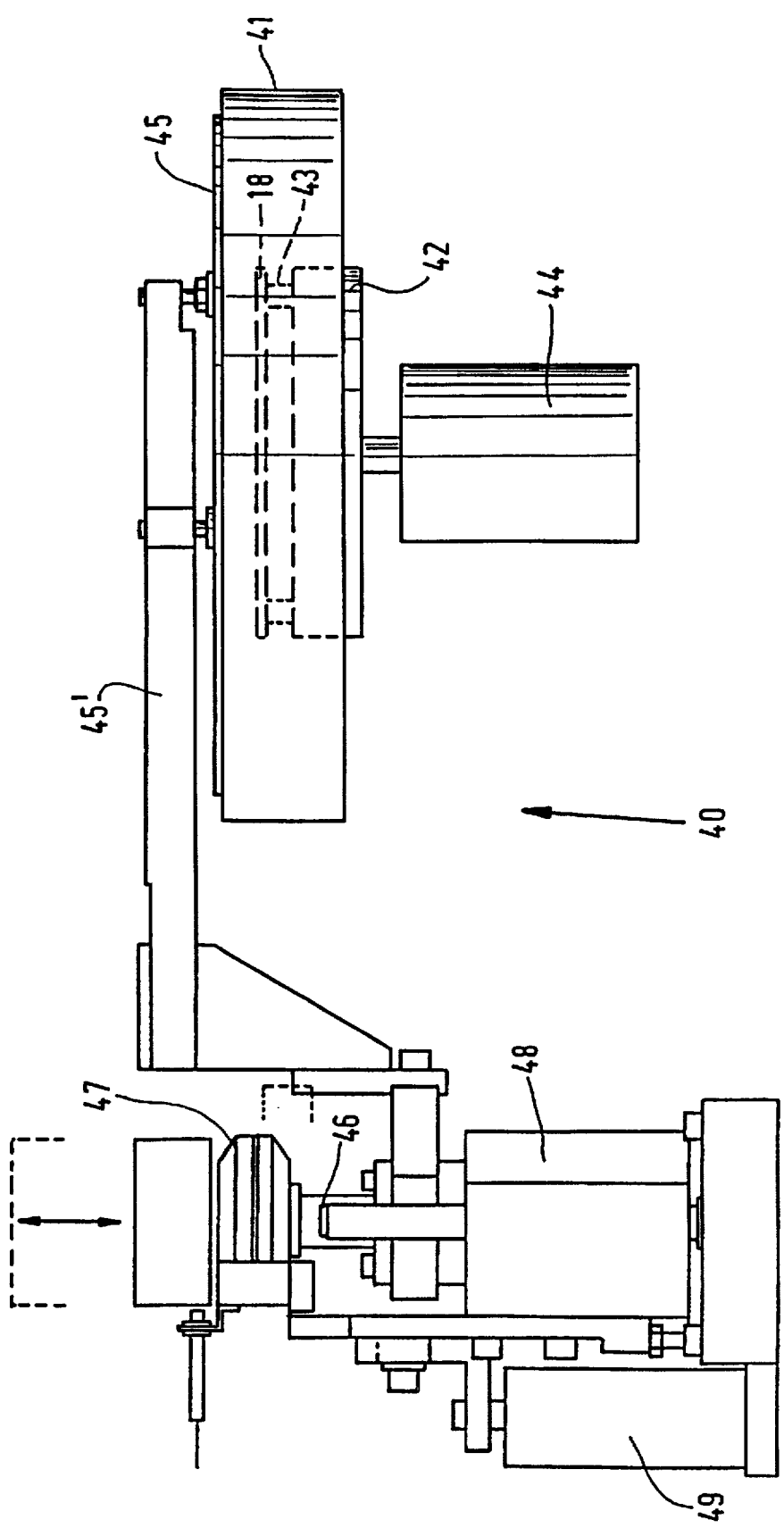
FIG. 8 is a side view of FIG. 7.

As is furthermore apparent from FIG. 7 a diaphragm 51, which slightly narrows the air passage, is provided between the rotary table and the heating coils in the air passage, in order to effect an air flow as even as possible over the substrate supported on the rotary table.

After the passage of hot air for the drying step cooler air for cooling the substrate is passed through the air line for some time.

In practice it has become apparent that in a suitable embodiment hot air is passed for ±3 minutes and cooling air is passed for ±7 minutes. In practice this implies that as a result of this a considerably shortening of the time required for drying the lacquer or photoresist has been obtained. So far it has been usual to have this drying take place in a separate oven, whereby the drying time amounts to ±1 hour.

After the photoresist layer has thus been dried and the pipe part 41 has been opened again by removing the cover 45, the substrate, which is now provided with a photoresist layer, may be supplied to a station 52 for recording the desired information on the registration carrier. This station 52 comprises a rotary table 53, on which the substrate 18 provided with a lacquer coating or photoresist layer can be placed by means of the transport mechanism. Furthermore the station 52 conventionally comprises a laser device 54, as well as an optical apparatus 55, by means of which the light beam is emitted to lenses 57 supported by a carrier 56. The carrier 56 is secured to a shaft 58, which can be moved lengthwise by means of a driving mechanism 59 in order to move the carrier over guide rails 60, in such a manner that the carrier moves over the substrate 18 supported by the rotary table 53. Thus the photoresist layer will be exposed in the desired manner in accordance with information or the like to be recorded.

After having been exposed in this manner the substrate 18 is moved to a station 61 by means of the above-described transport mechanism.

Figure 9:
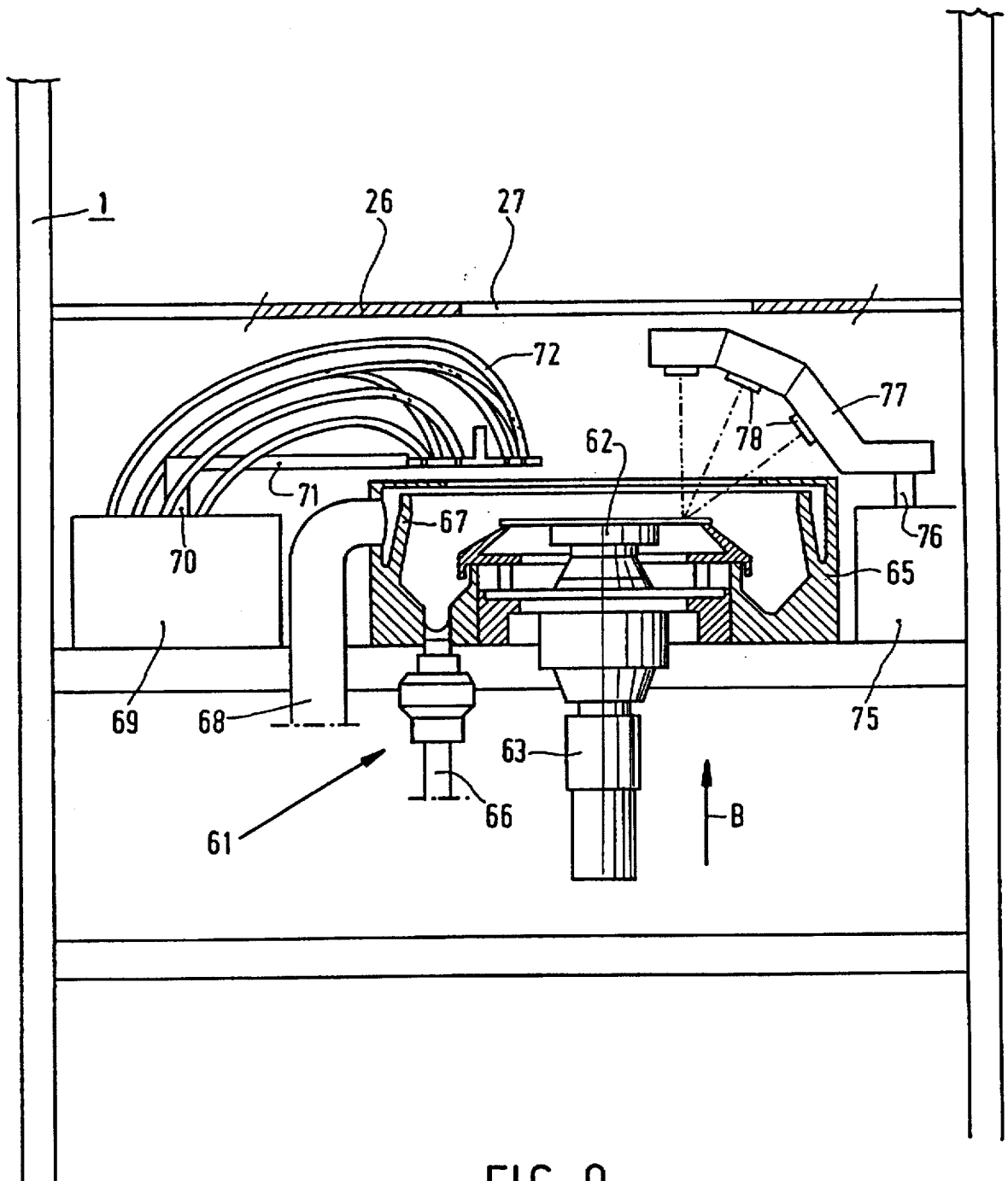
FIG. 9 is a view, partly in section and partly in elevation, of the developing and metallizing station.

As is shown in more detail in FIG. 9 the station 61 comprises a rotary table 62 for receiving a substrate. The rotary table 62 can be rotated about a vertical axis by means of a motor 63.

The rotary table 62 is disposed in a cup-shaped means 65, to the bottom side of which a drain pipe 66 is connected.

Near the upper side of the cup-shaped means 65 a circular recess 67 is provided in the cup-shaped means, the inner wall of said recess being located slightly lower than the outer wall, as will be apparent from FIG. 9. A pipe 68 for exhausting vapours is connected to said recess 67.

A rotary shaft 70, which is rotatable about a vertical axis of rotation by means of a driving mechanism 69, is provided near the rotary table, to which rotary shaft the end of an arm 71 is secured. The end of the arm 71 functions to support a plurality of pipes 72 for supplying various liquids when the end of the arm 71 in question supporting the pipes is located above the cup-shaped means in the manner indicated in FIG. 9.

From this position the arm 71 can be pivoted to a position in which the free end of the arm supporting the pipes is located above a pan 74 (FIG. 2), so that any liquid dripping from the pipes or rinsing liquid used for flushing the pipes can be drained via the pan 74.

It is noted that for easy reference the diagrammatically indicated arm 71 and the pipes 72 in FIG. 2 are not shown in their position above the pan 74, as is usual, but in a different position.

A further vertical shaft 76, which is rotatable by a driving means 75, supports an arm 77, to which three lenses 78 are secured. The lenses 78 function to pick up laser light beamed in the direction according to the arrow B, which can move through the substrate processed in the above-described manner and which is subsequently picked up by the lenses 78. The light picked up by the lenses is influenced by the configuration which the photoresist layer obtains during the processing step, and thus it is made possible to check whether or not the desired processing is carried out in the desired manner.

Various liquids are supplied in succession by means of the various pipes. First the substrate will be rinsed, after which a basic developing fluid is washed over the photoresist layer in order to remove the exposed materials from the photoresist layer. Whilst the photoresist layer is being developed in this manner the above-described checking by means of the laser light and the lenses 78 is in particular effected.

After that the remaining photoresist layer and/or the upper surface of the substrate 18 is metallized by supplying suitable liquids, generally provided with a nickel coating, so that a product is obtained which in principle corresponds with the product depicted in FIG. 2 of the aforesaid Dutch Patent Application No. 8802211.

After the substrate 18 and the photoresist layer applied thereto have thus been treated in the station 61 and after the arms 77 and 71 have been pivoted to a position beside the cup-shaped means, the substrate is transported to a subsequent station 80 by means of the transport mechanism, and that on a supporting plate 81 (FIG. 15) secured to the upper end of a supporting arm 82, which, when the substrate is being placed, occupies the vertical position shown in FIG. 14. From this position the supporting arm 82 is pivotable about a horizontal pivot axis 84 to the position illustrated in dotted lines in FIG. 14 by means of a setting cylinder (not shown), which is coupled to the arm 82 by means of a connecting rod 83.

More particularly the substrate 18 will thereby come to lie on the upper ends of a few compression springs 85 mounted within the supporting plate 81.

Then a thin metal contact ring 86, in particular made of stainless steel or nickel, must be placed on the substrate, the dimensions of said ring being such that the ring covers a narrow outer edge of the substrate and slightly projects beyond the substrate at the outer side.

Figure 10:
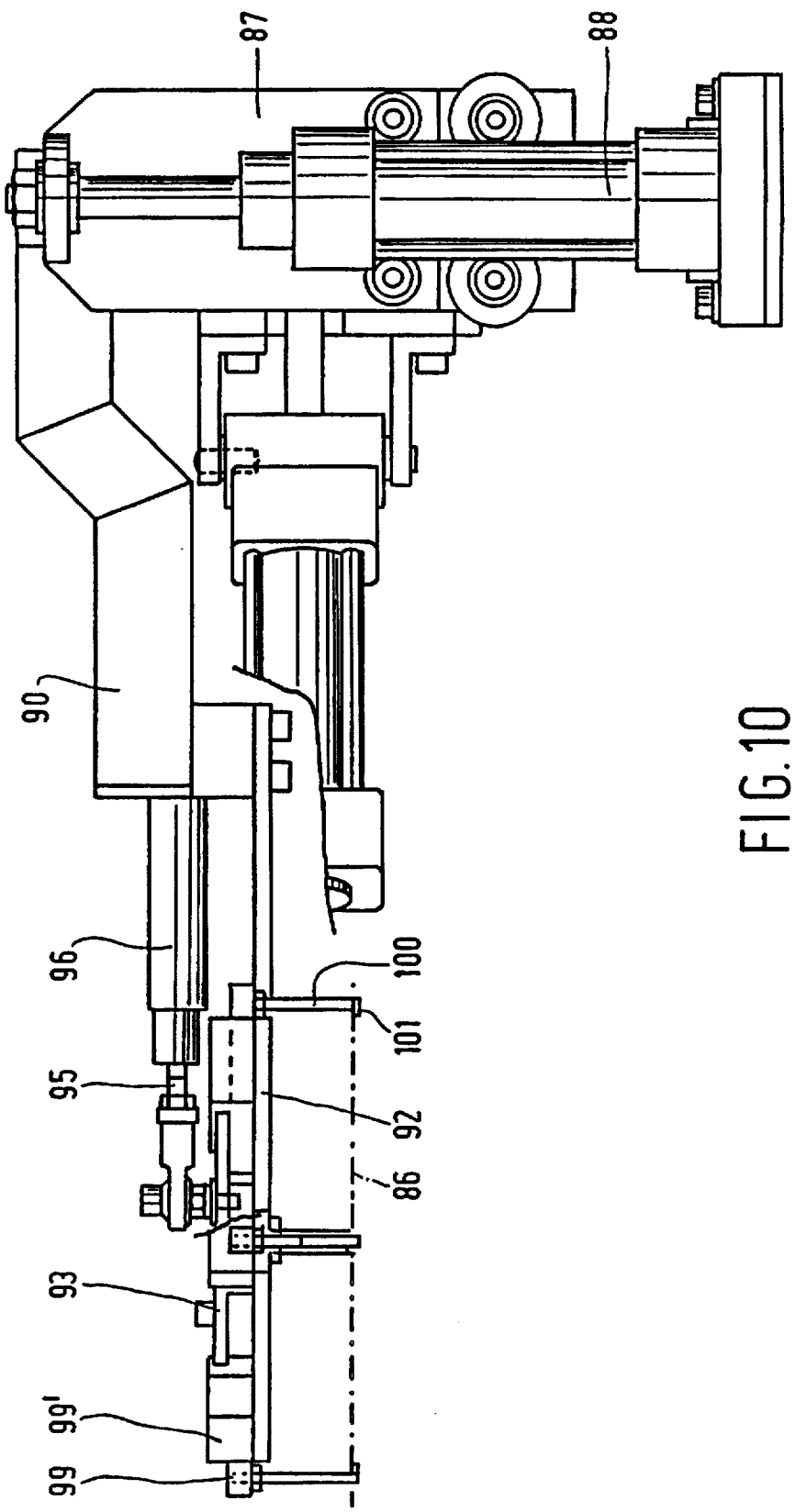
FIG. 10 is an elevational view of the means for placing contact rings on a substrate.
Figure 11:
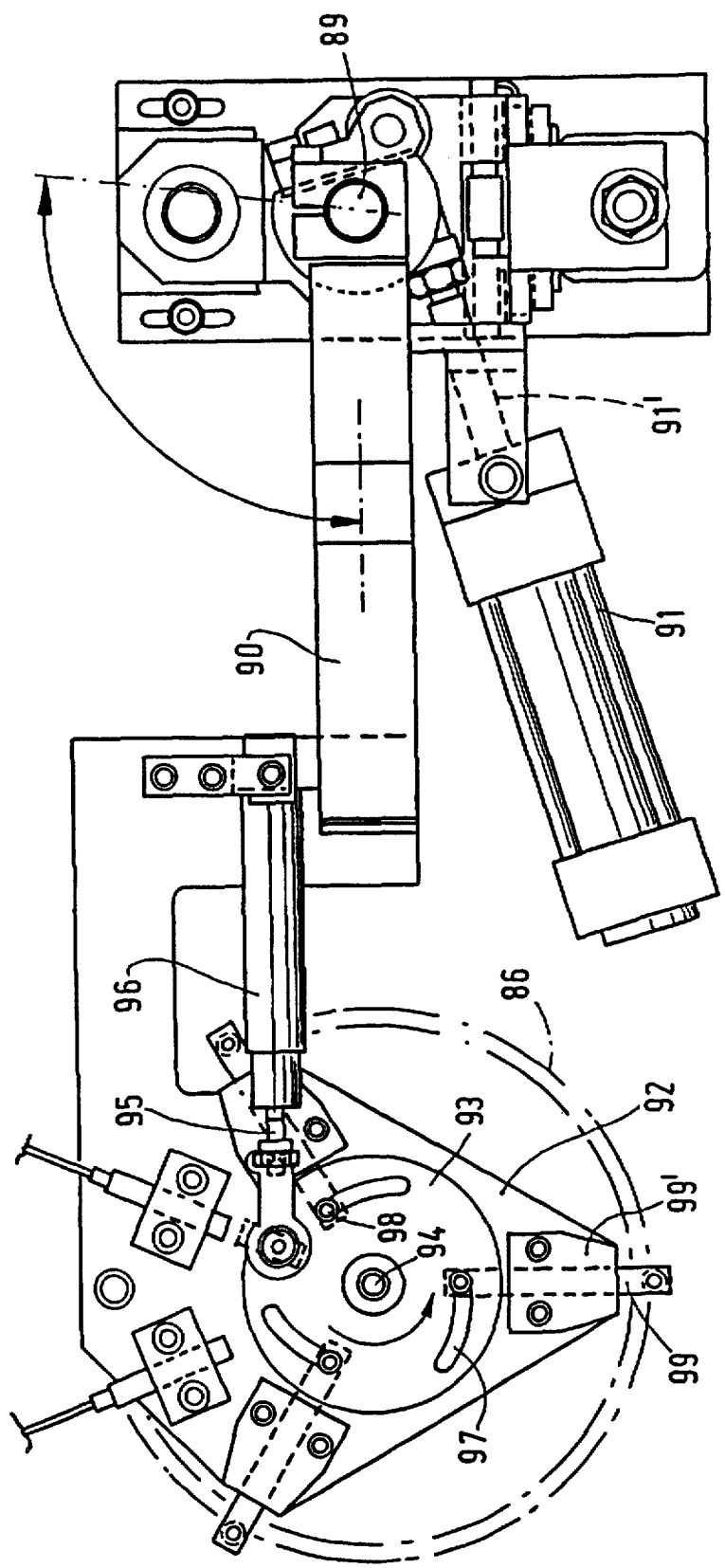
FIG. 11 is a plan view of FIG. 10.

The mechanism shown in FIGS. 10 and 11 is disposed in station 80 with a view of providing the metal contact ring 86.

This mechanism comprises a supporting means 87, which is vertically movable by means of a setting cylinder 88.

Said supporting means 87 supports a vertical shaft 89, to which one end of an arm 90 is secured.

The shaft 89 with the arm 90 secured thereto can be pivoted about the vertical axis of the shaft 89 by means of a setting cylinder 91 secured to the supporting means, the piston rod 91' of said setting cylinder being coupled to the shaft 89.

The free end of the arm 90 is formed by a plate 92. A disc 93 is supported on the plate 92, which disc is rotatable about an axis 94 with respect to the plate 92. The plate 93 is coupled to a piston rod 95 of a setting cylinder 96 secured to the arm 90 with a view to rotating the plate 93.

Three slotted holes 97 are provided in the plate 93, in such a manner that the distance between the axis 94 and the respective slotted holes from one end of each of said slotted holes to the other end of each of said slotted holes gradually increases. Vertical pins 98 are located within said slotted holes 97, said pins being connected to the ends of rods 99, which extend in radial direction with respect to the axis 94. The rods 99 are accommodated in guide blocks 99' secured to the plate 92 so as to be movable in longitudinal direction.

It will be apparent that when the plate 93 is being pivoted forwards and backwards by means of the setting cylinder 96, the rods 99 will be moved in their longitudinal direction.

Downwardly extending arms 100 are secured to the ends of rods 99, and fingers 101 are secured to the ends of said arms 100.

A plurality of rings 86, one lying above the other in a rack or the like, will be disposed near the station 80, for example in the position 86 diagrammatically indicated in FIG. 10.

The uppermost ring from the stack may now be picked up by means of the mechanism described with reference to FIGS. 10 and 11, by first moving the fingers outwards by means of the arms 99, and furthermore moving the fingers to a position in which they are located under the uppermost ring of the stack, by pivoting and vertically moving the arm 90 in a suitable manner, after which the fingers may be moved towards each other again, so that the fingers 101 will come to lie under the uppermost ring of the stack. Then the uppermost ring may be moved to a position above the substrate supported by the supporting plate 81, by suitably moving the arm 90 in vertical direction and pivoting said arm, so as to place the ring on said substrate in this manner.

After that the substrate and the ring placed on the substrate are to be clamped down on the supporting plate 85 for further processing.

Figure 12:
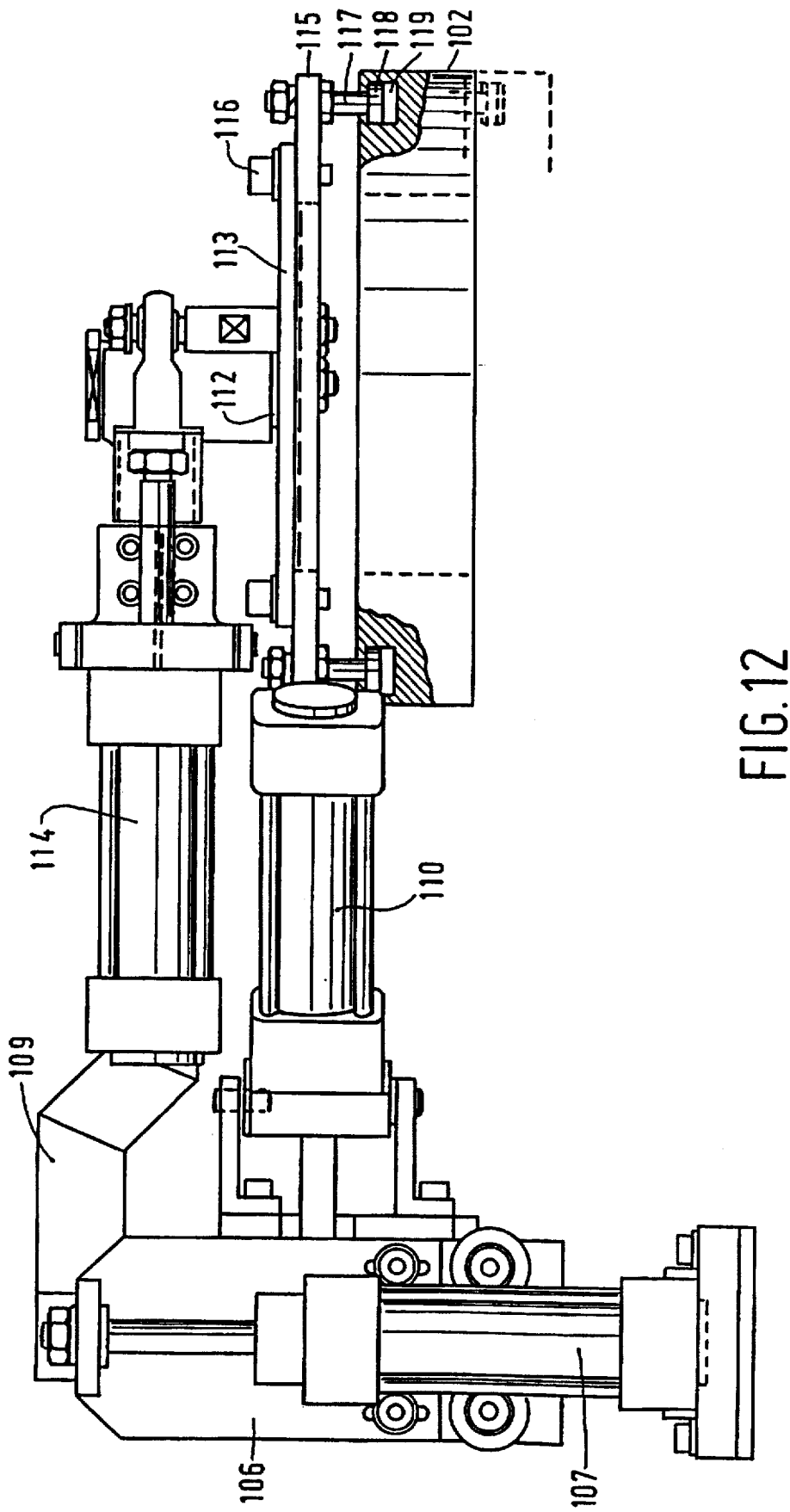
FIG. 12 is an elevational view of the means for placing a clamping ring on a substrate.
Figure 13:
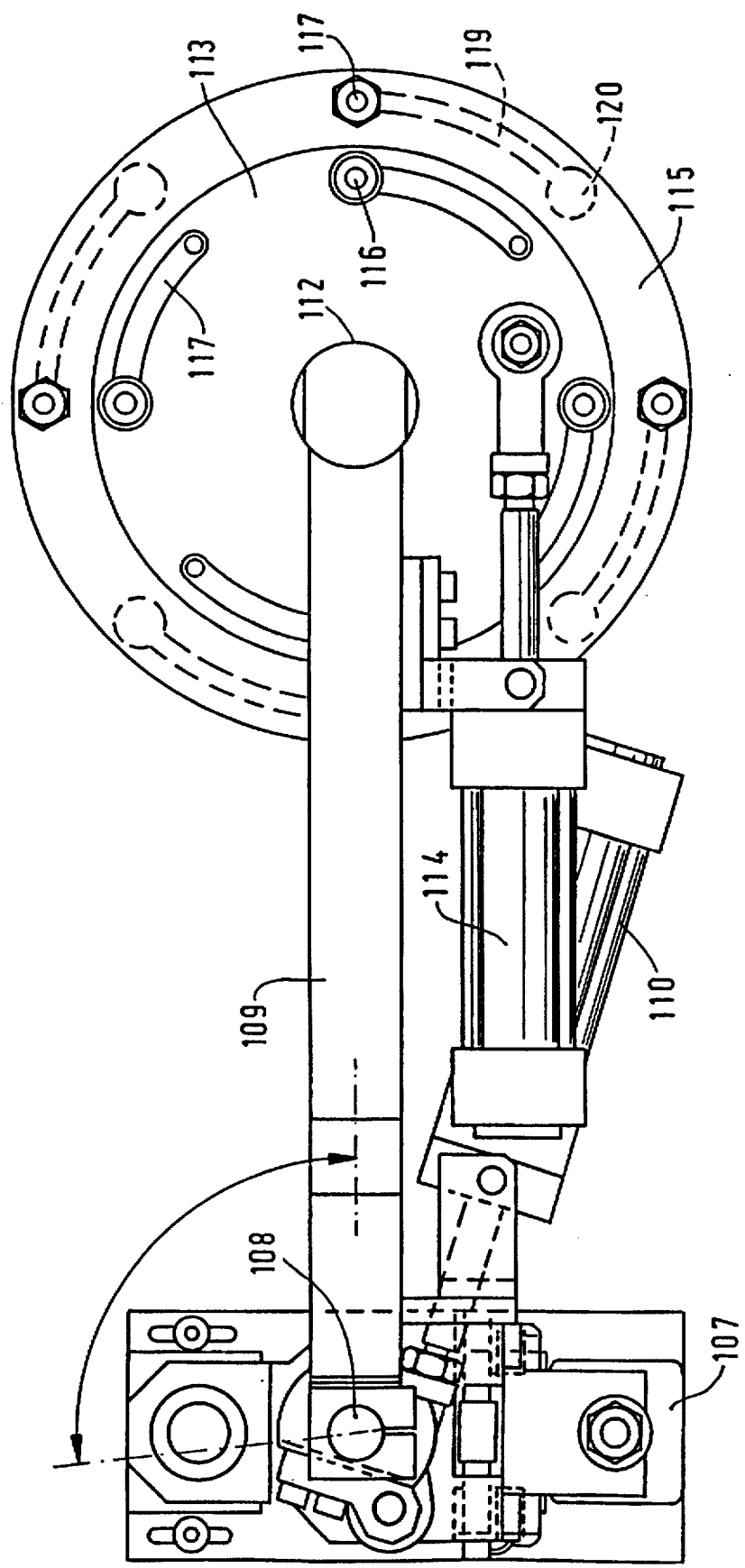
FIG. 13 is a plan view of FIG. 12.

The mechanism shown in FIGS. 12 and 13 is disposed in station 80 with a view to providing a clamping ring 102.

As is apparent in particular from FIG. 15, the clamping ring 102 has a more or less L-shaped section, the configuration being such that in the mounted position of the clamping ring 102 one leg of the clamping ring 102, with a sealing ring 103 provided therein, will come to lie on the ring 86, whilst the other leg will more or less extend along the outer circumference of the supporting plate 81. Three radially extending pins 104 are provided in the outer circumference of the supporting plate 81 in regularly spaced-apart relationship, in such a manner that said pins project beyond the outer circumference of the supporting plate 81, and are able to cooperate with L-shaped slotted holes 105 provided in the clamping ring 102, the short leg of said slotted holes being open at a point located at the inner side and bottom side of the clamping ring, and the long leg extending in circumferential direction.

The mechanism shown in FIG. 12 and 13 for providing or removing the clamping ring 102, as the case may be, comprises a supporting means 106, which is vertically movable by means of a setting cylinder 107. The supporting means supports a vertical shaft 108, to which the free end of an arm 109 is secured. The shaft 108, together with the arm 109, is pivotable about the central axis of the shaft 108 by means of a setting cylinder 110 secured to the supporting means 106, a piston rod of said setting cylinder being coupled to the shaft 108.

The free end of the arm 109 supports a disc 113 by means of a vertical shaft 112, said disc being rotatable about the central axis of the vertical shaft 112 by means of a setting cylinder 114 secured to the arm 109. A further plate 115 is secured to the bottom side of the plate 113 by means of bolts 116. Said bolts 116 are passed through slotted holes 117, in order to enable a correct adjustment of the two plates 113 and 115 with respect to each other.

A few pins 117 extending under the plate 115 are secured to the plate 115 at regular intervals. Heads 118 are secured to the bottom ends of said pins, which heads are accommodated in curved slotted holes 119 provided in the interior of the clamping ring 102, said slotted holes at one end being provided with an enlarged hole 120, which is open at the upper side of the clamping ring, through which a head 118 may be introduced into the slotted hole 119 or be removed therefrom, as the case may be, upon suitable vertical movement of the arm 109 with the parts supported by the arm and rotation of the plates 113 and 115 about the shaft 112.

By pivoting of the arm 109 the clamping ring 102 can be moved to a position above the supporting plate 81 shown in FIG. 15 and subsequently be moved downwards, in such a manner that the pins 104 will move towards the inside through the vertically extending parts of the L-shaped slotted holes 105 and the clamping ring 102 will be supported on the ring 86. Then the clamping ring may be rotated by rotating the interconnected plates 113 and 115 by means of the setting cylinder 114, whereby the clamping ring is taken along by the plates 113 and 115 via the bolts 117. At the end of the rotation the pins 104 will be located near the closed ends of the horizontally extending parts of the slotted holes 105. Then the plates 113 and 115 may be pivoted to a position in which the heads 118 will come to lie near the recesses 120, so that the plates 113 and 115 can then be moved upwards with the pins 117 whilst leaving behind the clamping ring 102 on the supporting plate 81.

Then, as is illustrated in dotted lines in FIG. 14, the substrate 18 thus clamped down and the stainless steel contact ring 86 clamped down thereon may be pivoted into a vessel 125 containing electrolytic fluid. A housing 126 is disposed within said vessel, which housing is provided with an opening 127 at one side, opposite which the supporting plate 81 with the substrate 18 clamped down thereon is disposed in the manner illustrated in dotted lines in FIG. 14.

As is furthermore indicated in FIG. 14 a plate 129 may be moved in front of the opening 127 within the housing 126, said plate being provided with a passage 130, which is adapted to the substrate surface to be metallized. Since the plate 129 is readily exchangeable with another plate having another passage, the size of the passage may readily be adjusted according to what is required.

Furthermore a receiving means 131 is placed within the vessel, in which receiving means a large number of metal balls, generally nickel balls 132, will be located. By using the construction illustrated the distance between the receiving means 132 containing the nickel balls and the substrate to be treated may be kept comparatively small, in the order of ±35 mm, which has a positive effect on the quick and even coating of the substrate.

As is furthermore indicated in FIG. 14 a number of liquid passages 133 are provided over a circumferential angle of ±50° in the wall of the housing 126 bounding the opening 127. Through these openings fresh electrolyte may be supplied, in such a manner that said fresh electrolyte approximately flows in a direction parallel to the surface of the substrate 18, as is indicated by means of the arrow C.

By constantly supplying fresh electrolyte a satisfactory deposition of the nickel on the substrate surface will be effected.

It will be apparent that the nickel deposit on the substrate and the metal contact ring placed thereon will for example act as a cathode thereby, and the nickel balls will form the anode, as is usual in processes like this.

Thus a thick coating will be applied to the substrate in this station, within the spirit as shown in FIG. 3 of the aforesaid Dutch Patent Application No. 8802211.

Once a sufficiently thick coating has been formed, the supporting plate 81 will be pivoted back again, whereby the supporting plate with the substrate and the coating will be rinsed with hot deionized water. Then the supporting plate is pivoted back to the position shown in FIG. 14, after which the clamping ring 102 can be removed by reversing the above-described steps for providing the clamping ring 102. Then the substrate with the coating provided thereon, which is now integral with the ring 86 placed on the substrate, may be removed by means of the transport mechanism and be placed on a pivotable arm 140, which is disposed in a further station 141. The construction of the pivotable arm 140 at least substantially corresponds with the above-described arm 23, and the substrates may be placed in a rack 142 provided in the station 141 by means of said arm 140, which is pivotable about a vertical axis and which is vertically movable as well.

The substrates processed in this manner can be removed from the device through an access door (not shown), so that the substrate can be removed in the usual manner, for example by hand, from the so-called male mould formed on the substrate in the above-described manner, which will look as shown in FIG. 4 of the above-mentioned Dutch Patent Application No. 8802211.

If necessary said male mould may be placed on a rotary table 145 present in the station 141 with its embossed surface turned upwards, after which a light source 146 (diagrammatically indicated), which is secured to an arm 147, which is pivotable about a vertical axis, may be moved over the plate so as to develop the residual lacquer or photoresist remaining behind on the male mould that has been formed. Then a spraying mechanism 149 secured to the end of an arm 148 (FIGS. 16, 17) may be pivoted above the male mould supported on the rotary table. The arm 148 can be moved upwards and downwards, in a similar manner as described above, by means of a setting cylinder 150, and also be pivoted about a vertical pivot axis by means of a horizontal setting cylinder 151.

Figure 16:
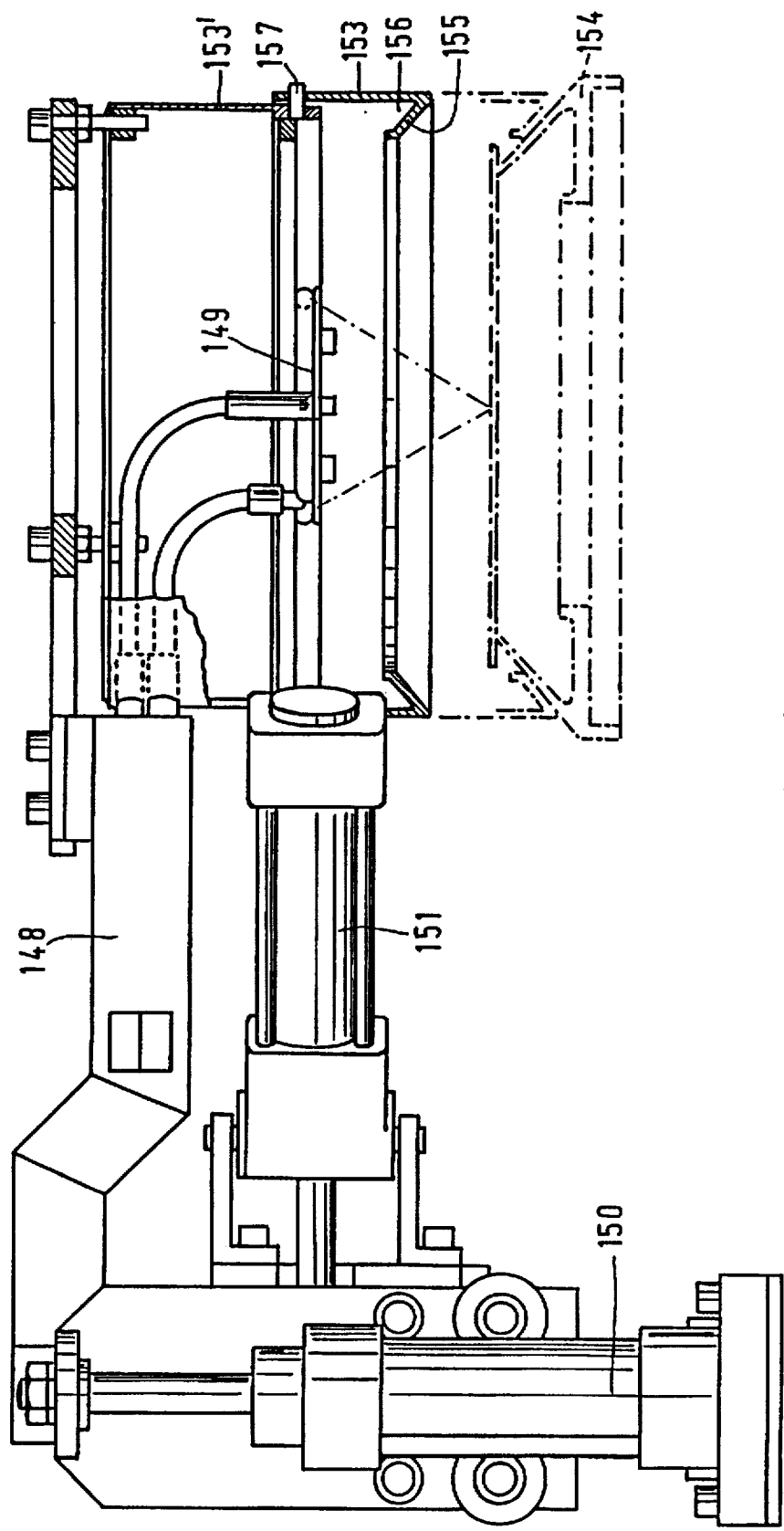
FIG. 16 is an elevational view of a part of a station, where the mould obtained can be subjected to a finishing operation.
Figure 17:
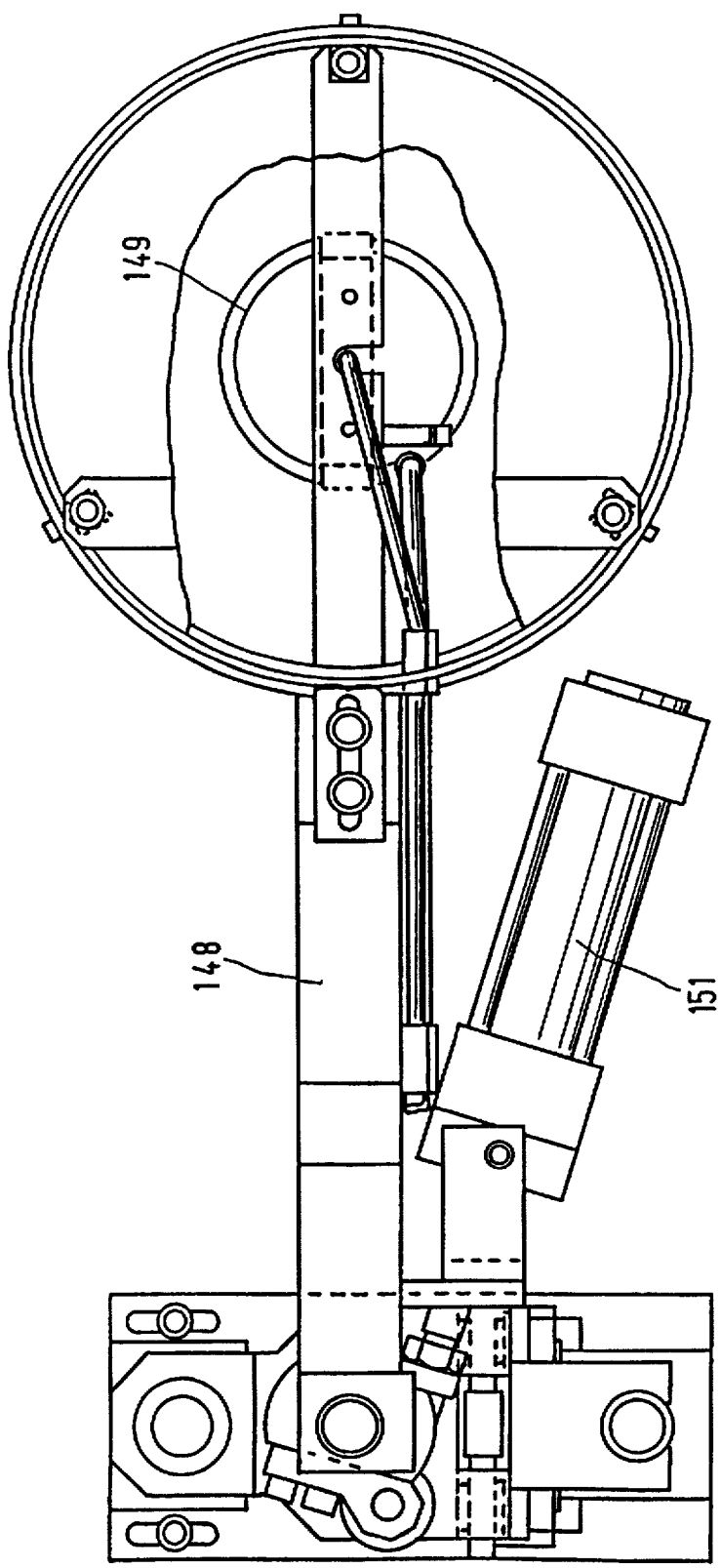
FIG. 17 is a plan view of FIG. 16.

In the position of the spraying mechanism 149 shown in FIG. 16 rinsing liquid may be sprayed on the male mould 152 supported, on the rotary table 145 (not shown in FIG. 16), so as to rinse the male mould.

Then a lacquer coating may be provided on the male mould 152 via the spraying device 149. For this purpose the arm 148 is moved downwards, so that a receiving ring 153 coupled to a shell 153' secured to the arm 148 and surrounding the spraying mechanism will come to rest on the upwardly tapering circumferential surface of the cup-shaped means 154 accommodating the rotary table 145. For this purpose a bottom ring 155 of the receiving ring is designed to slope upwards from its outer circumference towards the inside, as a result of which a space 156 for catching any residual lacquer is formed between the outer wall of the receiving ring 153 and the bottom ring 155. The receiving ring 153 is coupled to the shell 153' by means of pins 157 and suitable L-shaped slotted holes, which form some kind of bayonet catch, so as to be readily detachable, so that the receiving ring 153 can readily be removed and cleaned when a certain amount of lacquer has been collected in the ring.

The male mould thus completed may be discharged from the device so as to be stored and/or be supplied to further processing machines.

During operation the housing 1 will be closed and clean air can be supplied to the substrate processing stations through ducts 158 bounded by the housing and a grid 159.

The sequence in which the various stations are arranged may be different from the sequence described above and depicted in the Figures.

It is to be preferred, however, to provide the station 52 near one end of the housing 1, since the equipment disposed in said station, such as the laser device and the optics, comprises sensitive components, which require regular maintenance.

As a result of the arrangement of this equipment near one end of the device the equipment can be accommodated so as to be readily accessible.

Furthermore it is not necessary for the various stations to be arranged in a straight line. The housing 1 may also be curved, for example.

Although in the above several references have been made to Dutch Patent Application No. 8802211 it will be apparent that when using the device according to the invention, it will be possible to form a male mould on the substrate 18 by using a method which deviates from the method described in Dutch Patent Application No. 8802211.

We claim:

1. A method for manufacturing a mold for a disc-shaped registration carrier, wherein a substrate, on which said mold is to be formed is automatically moved in a horizontal plane and vertically thereto within a housing which is closed during normal operation, including the sequential steps of mounting the substrate into a station for applying a photosensitive layer to said substrate and applying a photosensitive layer, moving the treated substrate into a station for exposing the photosensitive layer in accordance with the registration data to be stored and exposing the photosensitive layer, moving the substrate into a station for developing the photosensitive layer and developing the photosensitive layer, and then applying a metal coating and metallizing the side of the substrate carrying the developed photosensitive layer.

2. A method according to claim 1, wherein prior to applying the photosensitive layer the substrate is cleaned.

3. A method according to claim 2, wherein following the step of applying the photosensitive layer, the photosensitive layer is dried.

4. A method according to claim 3, wherein the step of drying the photosensitive layer includes the steps of placing the coated substrate in an air line through which first heated air and then cooling air is passed.

5. A method for manufacturing a mold for a disc-shaped registration carrier, wherein a substrate, on which said mold is to be formed, is automatically moved between steps in a horizontal plane and vertically thereto by one of two transport devices, one for transporting dry substrates the other for transporting wet substrates, within a housing which is closed during normal operation, including the sequential steps of mounting the substrate into a station for applying a photosensitive layer to said substrate and applying a photosensitive layer, moving the treated substrate into a station for exposing the photosensitive layer in accordance with the registration data to be stored and exposing the photosensitive layer, moving the substrate into a station for developing the photosensitive layer and developing the photosensitive layer, and then applying a metal coating and metallizing the side of the substrate carrying the developed photosensitive layer.

* * * * *